United States Patent [19]

Widstrand et al.

[11] 4,074,156

[45] Feb. 14, 1978

[54] AIR COOLING MEANS FOR DYNAMOELECTRIC MACHINE

[75] Inventors: John C. Widstrand, Cedarburg; Dennis J. Jurek, Grafton, both of Wis.

[73] Assignee: Leeson Electric Corporation, Grafton, Wis.

[21] Appl. No.: 678,301

[22] Filed: Apr. 19, 1976

[51] Int. Cl.² .............................................. H02K 9/06
[52] U.S. Cl. ...................................... 310/62; 310/65; 165/47
[58] Field of Search ................. 310/52, 58, 59, 60, 310/61, 62, 63, 64, 65, 53; 165/47

[56] References Cited

U.S. PATENT DOCUMENTS

| | | | |
|---|---|---|---|
| 2,494,200 | 1/1950 | Ramqvist | 310/52 |
| 3,341,113 | 9/1967 | Sebok | 310/62 |
| 3,383,530 | 5/1968 | Dunn | 310/52 |
| 3,749,949 | 7/1973 | Muller | 310/62 |
| 3,749,953 | 7/1973 | Baumann | 310/62 |

Primary Examiner—R. Skudy
Attorney, Agent, or Firm—Ira Milton Jones & Associates

[57] ABSTRACT

In an electric motor having an external motor cooling fan mounted outboard of one of its rotor shaft bearings, the cup-shaped enclosure for said fan conventionally has its side wall radially spaced from a part of the frame to cooperate therewith in defining an annular outlet through which air from said fan is guided axially across the motor exterior, all around the same. According to the invention, that outlet is substantially blocked, as by an arcuate air barrier strip, to convert the fan enclosure into a plenum chamber from which pressurized air is forced through the motor interior for substantially greater cooling effectiveness.

4 Claims, 6 Drawing Figures

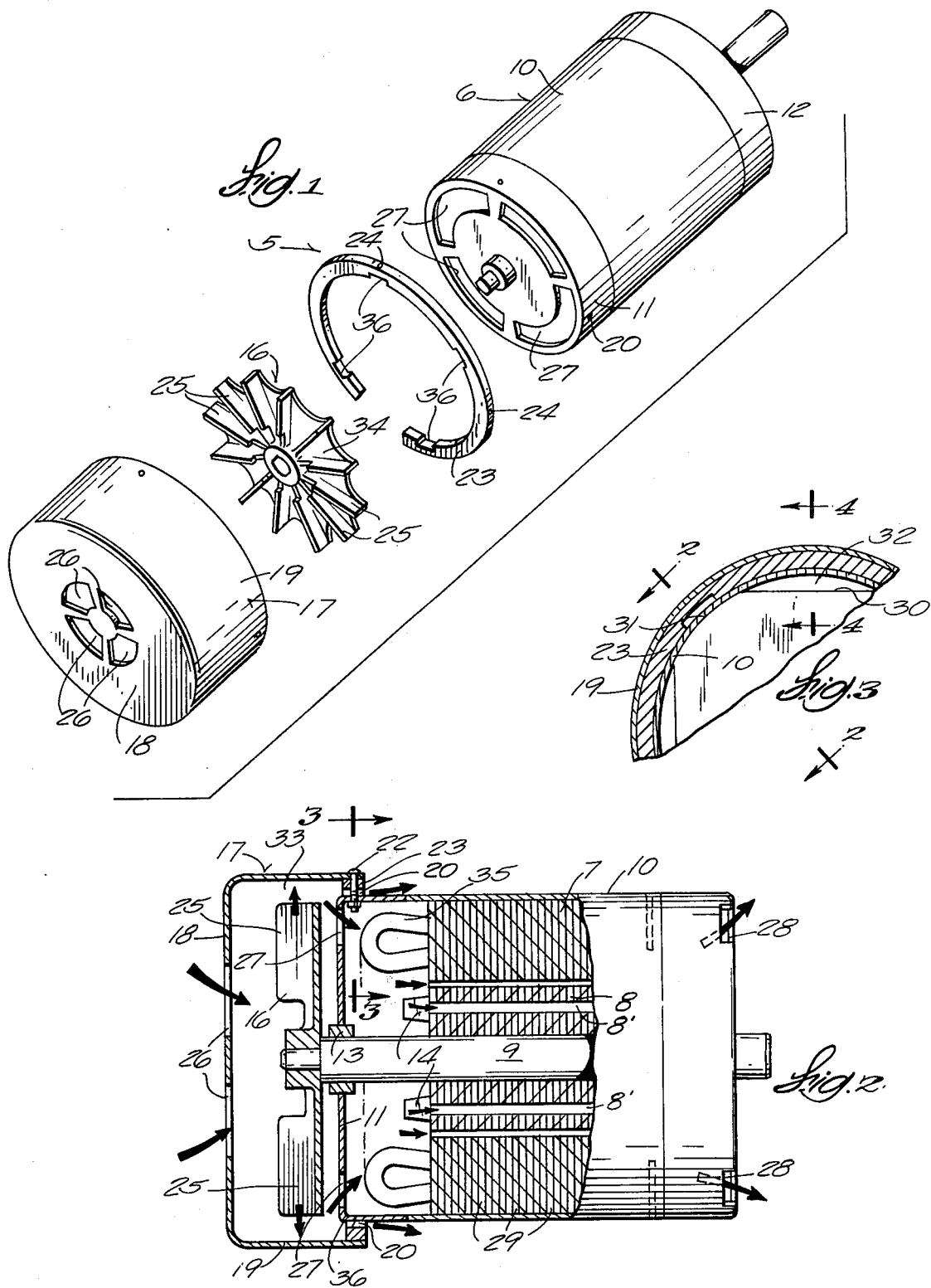

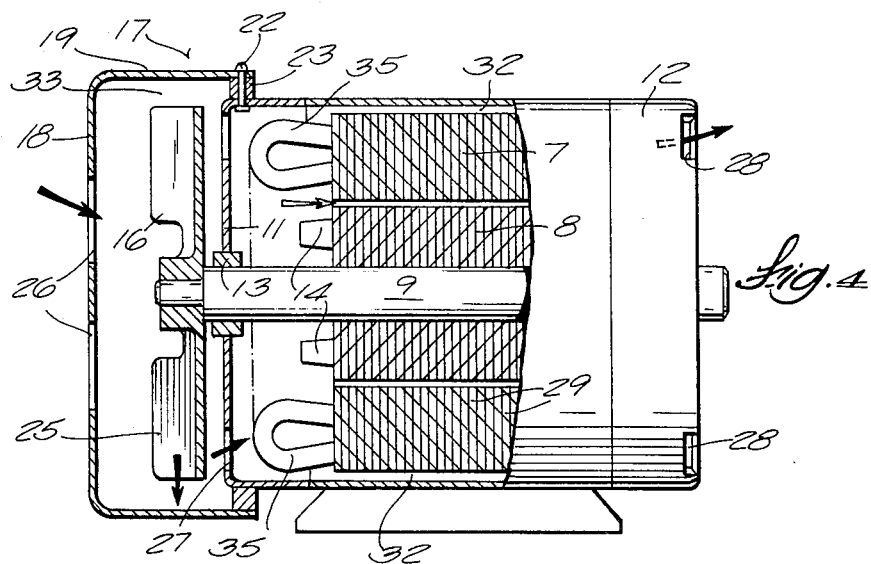
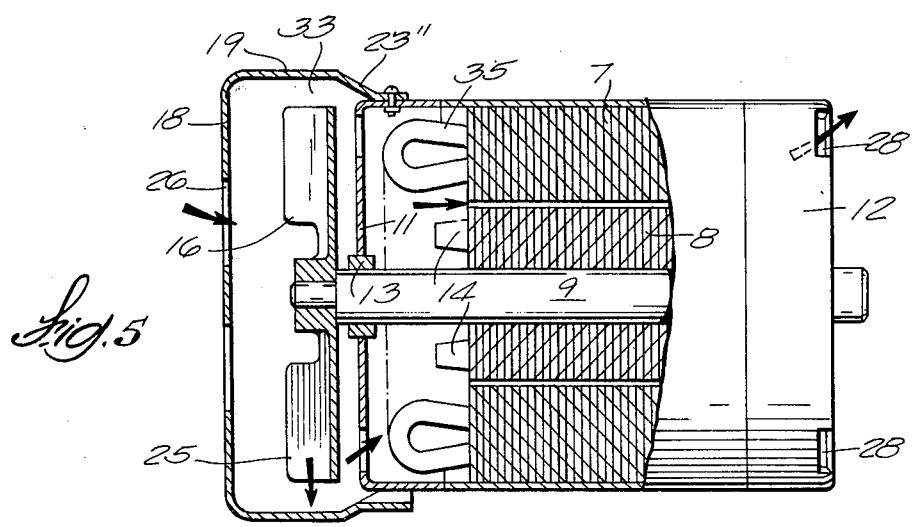
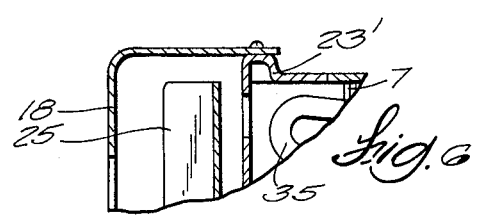

AIR COOLING MEANS FOR DYNAMOELECTRIC MACHINE

This invention relates to dynamoelectric machines of the type comprising a wound stator enclosed in a frame, a rotor having a shaft journaled in bearings that are fixed in end members of the frame, and an external fan for cooling the machine, constrained to rotate with the shaft and located outwardly adjacent to one of the end members; and the invention is more particularly concerned with means for improving the cooling effectiveness of the external fan of such a machine.

While the invention is applicable to dynamoelectric machines generally, it is herein described and explained, for purposes of specific example, in relation to an a.c. motor.

It is well known that the frame size needed for an electric motor of a given capacity is to a large extent dependent upon the rate at which heat can be dissipated from the windings and cores of its stator and rotor. If a motor is poorly cooled, it must be large for its horsepower, to provide adequate heat dissipation. With increased cooling effectiveness, the size of the motor for a given horsepower can be correspondingly reduced. A reduction in motor frame size for a given horsepower output does not necessarily entail any change in energy consumption, but it does involve the important benefits of saving materials, reducing selling price and affording other obvious advantages that flow from decreased bulk and weight.

In an effort to achieve efficient air cooling of electric motors, many different cooling fan arrangements have been proposed. Most motors that require forced air cooling have at least one internal fan, which often takes the form of a plurality of fin-like blades that project axially from one end of the rotor. Many motors are also equipped with an external fan that is constrained to rotate with the rotor shaft and is located outboard of the motor frame, that is, outwardly adjacent to one of the end bells that carry the bearings in which the shaft is journaled.

Because the external fan is located outside the motor frame, it can be substantially larger than the internal fan or fans and can therefore displace a much greater volume of air to effect much better cooling than would be available with only internal fans. Hence a motor with an external fan need not be substantially larger than a motor of equivalent horsepower that has no such fan, and it can be lighter and less costly because of its smaller frame size.

As examples of motors equipped with external fans, reference may be made to U.S. Pat. No. 3,383,529 to Baumann et al, No. 2,494,200 to Ramqvist and No. 3,383,530 to Dunn, Jr. In these, as in other prior motors equipped with external fans, the fan was enclosed in a more or less cup-shaped housing that not only served as a guard for the fan but also functioned as a shroud or deflector by which the airstream generated by the fan was directed mainly across the exterior of the motor. Usually the fan enclosure cooperated with an adjacent portion of the motor frame to define an annular air outlet behind the fan through which most of the air from the fan was expelled for axial flow across the exterior of the motor frame, all around the same. However U.S. Pat. No. 3,749,953 to Baumann et al discloses a motor wherein air propelled by an external fan is guided by baffle means through a small part of the interior of the frame before being expelled for circulation across exterior surfaces. That motor may have had somewhat better cooling than one wherein the output of the external fan was passed directly across the exterior of the frame, but it did not utilize the air flow from the external fan to best advantage, and a substantial amount of space was occupied by the baffle means that guided the air for its short detour through the frame interior.

In contrast to the teachings of the last mentioned Baumann et al patent, it is a premise of the present invention that a given volume of airflow is most effectively utilized for motor cooling if it is confined to the interior of the motor frame until it has traversed the entire length thereof and is thus prevented from remixing with ambient atmosphere until its potential for motor cooling is exhausted. The invention is also based on the rational premise that improvements in motor cooling can be achieved at the lowest possible cost if previously standardized and conventional motor parts can be employed, substantially without modification, in combination with a new and additional part that is easily made and easily installed, to provide a new and more effective flow path for air propelled by an external cooling fan.

Thus the general object of the present invention is to provide very simple and inexpensive means for so modifying the heretofore conventional structure of an electric motor having an external cooling fan as to achieve substantially more effective cooling without any necessity for discarding, modifying or altering parts that have been standardized for previously built motors.

More specifically, it is an object of the invention to provide a simple and very inexpensive element which can be quickly and easily installed on a motor of heretofore conventional type having an external cooling fan, whereby cooling of the motor is so improved that a motor of a given horsepower can be built on a frame that is one or two standard NEMA sizes smaller than was heretofore considered necessary for adequate cooling.

A further object of the invention is to provide simple and effective means for causing most of the cooling air passed through an external fan to be forced through the interior of the motor frame, for heat exchange with parts of the motor that tend to get hottest, and whereby streams of cooling air can be selectively directed across only those exterior surface areas of the motor that tend to be most highly heated, to thus utilize the available flow of cooling air to greatest advantage.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which:

FIG. 1 is an exploded perspective view of an electric motor embodying the principles of this invention;

FIG. 2 is a view of the same motor, partly in elevation and partly in longitudinal section on the plane of the line 2—2 in FIG. 3;

FIG. 3 is a fragmentary transverse sectional view taken on the plane of the line 3—3 in FIG. 2;

FIG. 4 is a view of the same motor, partly in side elevation and partly in longitudinal section on the plane of the line 4—4 in FIG. 3;

FIG. 5 is a view generally similar to FIG. 2 but illustrating a modified embodiment of the invention; and FIG. 6 is a fragmentary view in longitudinal section illustrating another modified embodiment of the invention.

Referring now to the accompanying drawings, the numeral 5 designates generally a motor embodying the improvement of the present invention but which is otherwise generally conventional. Thus the motor 5 comprises a main housing or frame 6 that encloses an annular stator 7, and a rotor 8 that rotates within the stator on a shaft 9. The frame 6 comprises a cylindrical and generally tubular central portion 10 and complementary front and rear end members or end bells 11 and 12, respectively, that are apertured to provide for circulation of cooling air through the interior of the motor. The tubular frame member 10 is imperforate through at least the major portion of its length but may have air outlet apertures (not shown) near the rear end bell 12. The end members 11 and 12 support bearings 13 in which the rotor shaft 9 is journaled. There may be an internal fan on the rotor, comprising circumferentially spaced, radially extending fin-like vanes 14 that project axially from one end of the rotor core; and there may be a second such internal fan at the opposite end of the rotor. Conventionally, baffle means in the motor interior cooperate with the vanes on the rotor core to cause air circulation from front to rear, through the space between the stator 7 and the rotor 8 and through air passages 8' that extend axially through the rotor core.

The motor 5 is further conventional in having an external fan 16 housed in a generally cup-shaped fan enclosure 17 at what can be designated as the front end of the motor. The fan 16 is secured to the rotor shaft 9 to rotate therewith at a location forwardly adjacent to the front end member 11. The fan enclosure 17 has an apertured end wall 18 forwardly adjacent to the external fan and has a cylindrical side wall 19 which is larger in diameter than the motor frame and concentric thereto. The side wall 19 of the fan enclosure, which concentrically surrounds the external fan, projects behind the same a distance to also surround a front portion 20 of the frame. Thus the rear edge portion of the side wall 19 and its radially opposite portion 20 of the frame conventionally cooperate to define an annular space.

In prior motors comprising the conventional components described above, the annular space just mentioned was left open to serve as an outlet through which the external fan blew air rearwardly for flow across the exterior of the motor. Screws 22 or the like extended across that outlet at a few circumferentially spaced intervals around it, for concentric securement of the fan enclosure to the frame; but such securement means constituted insignificant obstructions, and therefore air flowed out of that space around the entire circumference of the motor. This is to say that substantially all of the air flow generated by the external fan was circulated across the exterior of the frame. Owing to the substantial overlap between the frame and the side wall 19 of the fan enclosure, the annular air outlet conjointly defined by them tended to impart an axial flow direction to the air issuing therefrom, but after the air had left that outlet there was nothing to confine it in heat exchanging contact with the frame, so that some portion of the air that was circulated by the external fan was permitted to remix with ambient air before its cooling capacity had been fully utilized. To the extent that this occurred, there was a waste of the capacity of the external fan and of the energy used in driving it.

In accordance with the principles of the present invention, the air outlet formerly defined by the frame and the fan enclosure side wall 19 is blocked either wholly or in substantial part by means of an arcuate filler strip or air barrier 23, which so cooperates with the heretofore conventional structure as to cause as least a major portion of the air output of the external fan to circulate through the interior of the motor frame.

The air barrier can be readily made from a strip of aluminum or the like that is bent into an arc of the required radius and has a thickness dimension to fill the space between the frame and the fan enclosure side wall. Radial holes 24 through the strip receive the screws 22 or other fasteners that hold the fan enclosure to the frame, so that even with respect to its securement the air barrier strip 23 can cooperate with unmodified conventional structure.

In effect, the air barrier strip converts the radially outer portion of the fan enclosure 17 from an air deflector to a plenum chamber 33 that serves as a source of pressurized air for flow through the motor interior. Pressure is built up in that plenum chamber by the conventional external fan 16, which has flat blades or vanes 25 that have their surfaces parallel to the fan axis to produce a substantially radially outward air flow. Air is drawn into the fan 16 through air inlet apertures 26 in the front wall 18 of the fan enclosures that are spaced inwardly from its periphery.

The main outlet through which pressurized air can escape from the plenum chamber around the periphery of the fan 16 is provided by the conventional apertures 27 in the adjacent front end member 11 of the motor frame. The apertures 27 are spaced radially outwardly from the center of the end bell 11 and provide for axial flow of air into the interior of the motor. They have their conventional counterparts in apertures 28 in the rear end member 12, through which cooling air can pass out of the interior of the motor. Even taking into consideration the existence of possible outlets in the tubular member 10, near its rear end, as mentioned above, the motor frame can be regarded as substantially imperforate except for the apertures 27 and 28. The air barrier strip 28 therefore causes the relatively large output of the external fan 16 to be forced mainly through the motor interior, along the whole length thereof, so that the fan-propelled air is confined in heat exchange relationship with hot motor parts until its cooling potential has been utilized to the fullest possible extent.

When the airflow generated by the external fan is thus forced through the interior of the motor, certain features of conventional motor construction contribute to its cooling effectiveness. In most a.c. motors the stator core comprises a stack of more or less annular laminations 29. In many cases, to effect savings in lamination material, the outer edge of each lamination, instead of being circular, has straight edge portions 30 that alternate around its circumference with arcuate edge portions 31. Since the laminations all have the same orientation when they are stacked in the stator core, the core has corresponding flat side surfaces that alternate around it with curved surface portions. The curved surface portions lie in contacting engagement with the inner cylindrical surface of the central frame member 10, while the flat surfaces cooperate with that frame member to define channels 32 through which cooling air can flow rearwardly inside the frame and in contact with the core. The channels 32 have been present in many prior motors, but heretofore their existence has been mainly incidental to the saving of lamination material, and such forced airflow as occurred through them was mainly due to the internal fan or fans, supplemented by what might be considered leakage from the external fan. It will be seen that with the present invention the channels 32 acquire additional significance because of the substantial flow of cooling air that is forced through them from the plenum chamber 33. Such air not only abstracts heat from the stator core, transferred to it from the windings, but also picks up heat that has been transferred to the frame from the stator core.

The conventional location of the air circulation apertures 27 and 28 in the frame end members 11 and 12 favors circulation of cooling air through the channels 32, inasmuch as those apertures are spaced well away from the centers of the end members to provide a fairly direct path for airflow from the plenum chamber to those channels. The external fan 16 has the conventional back plate 34 that is normal to its axis and extends radially outwardly a substantial distance along its blades. This back plate is intended to improve the performance of the fan by confining air at its central portion to a substantially radial flow and allowing a low pressure zone to exist at the motor side of its back plate. It will be apparent that the present invention requires no alteration in the configuration of the external fan, and that its back plate cooperates nicely with the air barrier 23 in allowing air to move axially into the motor interior.

Although the high volume air flow through the channels 32 plays an important role in motor cooling, it should not be overlooked that the pressurized air forced into the interior of the motor frame also provides a high rate of cooling air flow across the end turns 35 of the stator windings (which are particularly in need of cooling) and across the rotor 8 and the radially inner surfaces of the stator core. Forced flow of cooling air lengthwise through the axially extending cooling passages 8' in the rotor, as well as axially over its entire external surface, is very advantageous from the standpoint of motor efficiency, especially in the case of a motor having cast rotor bars. Rising temperature causes an increase in the resistance of cast rotor bases and thus results in increased slip of the rotor at running speeds. As is well known, efficiency decreases with increasing slip in a motor of the type here under consideration.

The exterior surface of the stator frame tends to be hottest at those zones where the round surface portions of the stator core are engaged with the central frame member 10. With the present invention, a portion of the cooling air output of the external fan can be employed for cooling those particular zones, so that the entire exterior of the motor can be cool to the touch. For such localized exterior cooling, the arcuate air barrier strip 23 has notches 36 formed in its radially inner surface, each of said notches being so located as to be aligned with one of the zones just mentioned when the strip is in place. Each such notch of course cooperates with its radially opposite surface portion of the motor frame to define a small outlet through which air can issue from the plenum chamber 33 in a directed stream that sweeps rearwardly along a selected portion of the exterior surface of the motor.

It will be apparent that the notches 36 can be readily and inexpensively formed to provide external cooling air streams wherever they are needed around the circumference of the motor. Moreover, the volume of cooling air issuing from each such outlet is controlled by the depth of the notch that defines it, as measured in the radial direction across the arcuately curved strip 23. In turn, control of the depth of the notches controls the relative proportions of the air flow through the interior of the frame and across its exterior, respectively, so that simple and inexpensive modifications of the air barrier strip adapt it for use with motors having different numbers of poles and correspondingly different speeds that entail different external fan air pressures. The invention thus affords the utmost flexibility in providing for the effective cooling of motors of many different configurations, with minimal tooling costs to adapt it for each different configuration.

If desired, the circumferentially extending surfaces of the notches 36 can be inclined obliquely rearwardly and toward the motor axis, to deflect cooling air radially inwardly against the frame. Instead of notches, the air barrier strip can of course have small discontinuities to define outlets for external cooling air, although it will be obvious that notches in a continuous strip would be preferable in most cases.

Where an already-standardized front end member 11 is not going to be used, the air barrier can be formed as an integral circumferential ridge or land 23' on that frame member, as illustrated in FIG. 6. As another obvious alternative, the air barrier can be formed integrally with the side wall 19 of the fan enclosure, as a circumferential radially inwardly projecting flange or lip 23'' on the rear edge thereof, as illustrated in FIG. 5. In most cases, however, maximum flexibility and lowest cost will be obtained with the use of a separate strip, as previously described.

From the foregoing description taken with the accompanying drawings, it will be apparent that this invention provides simple and inexpensive means, cooperable with heretofore conventional standardized components of an electric motor having an external cooling fan, for improving the cooling effectiveness of that fan to such an extent that a motor of a given horsepower which incorporates the invention can be built on a frame one or two standard NEMA sizes smaller than an equivalent motor not incorporating the invention.

Those skilled in the art will appreciate that the invention can be embodied in forms other than as herein disclosed for purposes of illustration.

The invention is defined by the following claims:

1. A dynamoelectric machine having a wound stator, a frame that encloses the stator and comprises front and rear end members, said frame being substantially imperforate except for axially opening apertures in said end members that provide for circulation of cooling air into and out of the interior of the frame, a rotor having a shaft journaled in bearings in said end members, a cooling fan constrained to rotate with said shaft and located forwardly adjacent to the front end members, and a fan enclosure comprising an apertured front wall forwardly adjacent to the fan and a substantially imperforate circumferential side wall extending rearwardly from said front wall in concentric surrounding relation to the fan, said side wall having a rear portion which is larger in diameter than the frame and which is disposed radially opposite a front portion of the frame all around the same, said machine being characterized by:

air barrier means extending radially across the space between said rear portion of the side wall and said front portion of the frame and circumferentially around at least most of the frame, said air barrier means cooperating with the frame and with the side wall of said fan enclosure to define an annular plenum chamber in the radially outer portion of said fan enclosure from which pressurized air is mainly constrained to flow into the interior of the frame, and thus through the entire length thereof, by way of said apertures in the end members, while no more than a minor portion of air from said plenum chamber is directed across the exterior of the frame, said air barrier means comprising an arcuate strip, curved to closely embrace said front portion of the frame and having a radial thickness to extend substantially entirely across the space between said side wall and said front portion of the frame, said strip being secured in said space by fastening means that also secure the fan enclosure to the frame.

2. In a dynamoelectric machine having a frame which encloses a wound stator and which comprises front and rear end members that are apertured for circulation of cooling air through the interior of the frame, a rotor having a shaft journaled in bearings in said end members, and structure for circulating air in cooling relation to the machine, which structure comprises a fan located forwardly adjacent to the front end member and constrained to rotate with the shaft, and a fan enclosure having an apertured front wall forwardly adjacent to the fan and a side wall extending rearwardly from said front wall in concentrically surrounding relation to the fan; said side wall having a rear portion which is in radially spaced relation to a front portion of the frame all around the same and which cooperates with said portion of the frame for defining an annular space, the improvement by which air propelled by the fan is used to effect optimum cooling for the machine, which improvement comprises:

a curved strip embracing said portion of the frame and having a length and a thickness to substantially fill said annular space, said strip being confined between the rear portion of said side wall and said front portion of the frame to provide an air barrier which pressurizes the radially outer portion of the fan enclosure and thus compels at least a substantial portion of the air passing the fan to be circulated through the interior of the frame.

3. The dynamoelectric machine of claim 2, further characterized by:

said strip having lengthwise spaced apart portions that are of reduced width, to define air outlets of limited area through which streams of air can issue from the fan enclosure and flow along the exterior of the frame, said reduced width portions being axially aligned with those external portions of the frame to which the greatest amounts of heat are conducted from the interior of the machine.

4. The dynamoelectric machine of claim 2, wherein said rotor has a core surrounding the shaft and secured to the same, further characterized by:

said core having a plurality of air passages extending axially therethrough, through which air circulated through the interior of the frame flows lengthwise to cool the rotor.

* * * * *